United States Patent [19]

Gantwerker et al.

[11] Patent Number: 5,281,433
[45] Date of Patent: Jan. 25, 1994

[54] PROCESS FOR PREPARING A PRE-COOKED, MICROWAVEABLE FROZEN BAKED FOOD PRODUCT

[75] Inventors: Scott Gantwerker, Buffalo Grove; Gerald E. Walsh, Crystal Lake, both of Ill.

[73] Assignee: The Quaker Oats Company, Chicago, Ill.

[21] Appl. No.: 914,717

[22] Filed: Jul. 16, 1992

[51] Int. Cl.$^5$ .................. A21D 13/00; A21D 13/08; A21D 15/02

[52] U.S. Cl. .................. 426/549; 426/19; 426/21; 426/241; 426/242; 426/243; 426/524

[58] Field of Search .................. 426/19, 21, 549, 524, 426/241–243

[56] References Cited

U.S. PATENT DOCUMENTS

| | | | |
|---|---|---|---|
| 4,303,687 | 12/1981 | Ratjen | 426/497 |
| 4,746,526 | 5/1988 | Carroll | 426/496 |
| 4,861,601 | 8/1989 | Seneau | 426/19 |
| 4,885,180 | 12/1989 | Cochran et al. | 426/241 |
| 5,104,669 | 4/1992 | Wolke et al. | 426/94 |
| 5,110,614 | 5/1992 | Corbin et al. | 426/555 |

OTHER PUBLICATIONS

*Texture Changes in White Bread: Effects of Processing and Storage;* U. Stollman and B. Lundgren; Cereal Chem. 64(4):230–236 (1987).

Primary Examiner—Jeanette Hunter
Assistant Examiner—Mary S. Mims
Attorney, Agent, or Firm—Mart C. Matthews; Lars S. Johnson

[57] ABSTRACT

The present invention comprises a process for preparing a pre-cooked, microwaveable frozen baked food product, said process comprising: (a) preparing a dough and shaping the dough into a desired preform; (b) baking the preform to a fully baked state to produce a baked product having an outer crust; and (c) freezing and tempering the baked product by adding moisture to the outer crust in an amount sufficient to raise the moisture content of the baked product to within the range of from about 20% to about 55% by weight, thereby producing a frozen, tempered baked food. The present invention further comprises a product produced by the above-described process.

8 Claims, No Drawings

PROCESS FOR PREPARING A PRE-COOKED, MICROWAVEABLE FROZEN BAKED FOOD PRODUCT

FIELD OF INVENTION

The present invention relates to a process for preparing a pre-cooked, microwaveable frozen baked food product. The present invention also relates to the product of such process.

BACKGROUND OF INVENTION

Microwave ovens provide a number of convenience benefits. For example, they are useful for quickly defrosting frozen fresh foods such as frozen fresh meats; quickly cooking raw foods; and quickly reheating pre-cooked materials, both frozen and non-frozen. However, there are a number of problems associated with using microwave ovens for reheating frozen, pre-cooked items, especially baked foods such as buns, breads, rolls, etc., and products containing or prepared with or from baked foods such as French bread pizza, turnovers, pastries, etc. One significant problem is that the baked foods tend to be tough, dried out and excessively chewy after being reheated in a microwave. These pre-cooked, frozen baked foods also tend to be intolerant of power variations in the broad spectrum of microwave oven brands in use today. This power variation, and intolerance, has an impact on the requirements for reheating a frozen product. For example, in one brand of microwave oven it may take 3 minutes on a high setting to optimally reheat a frozen, pre-cooked baked food product, whereas in another brand of microwave oven it may take only two and one-half minutes on a high setting to optimally reheat that same frozen, pre-cooked baked food product.

Thus, it would be desirable to prepare a pre-cooked, frozen baked food product which can be reheated in a microwave oven and not have the poor texture associated with microwaved products such as a tough, dry and excessively chewy texture. It would also be desirable to produce a frozen, pre-cooked baked food product which is less sensitive to the power variations between different brands of microwave ovens. The present invention provides such a product, as well as a process for making such a product.

BACKGROUND ART

U.S. Pat. No. 4,746,526, issued May 24, 1988 to Carroll, discloses a method for manufacturing a pre-cooked, chemically leavened frozen biscuit wherein a conventional, chemically leavened biscuit dough is prepared, cut into biscuit pre-forms, and fully baked. The baked intermediate product is then tempered, that is moisture treated, to raise the upper crust moisture content to at least 16% by weight. The tempered product is then frozen. The frozen biscuit should be baked by placing it directly into a hot oven where it is heated to 165° F. Following removal from the hot oven, the biscuit is similar to fresh baked biscuits when served hot.

U.S. Pat. No. 4,861,601, issued Aug. 29, 1989 to Seneau, discloses a frozen, pre-proofed, partially-baked bread product, wherein the baking of the product is finished by the consumer, and a method for preparing such product. In the disclosed method, dry ingredients are mixed with water and a leavening agent, as well as a taste enhancing ingredient such as salt. Following mixing, the temperature of the ingredients is preferably adjusted to about 78° F. The dough is then rested to let fermentation start, typically for 10 minutes at ambient temperature and humidity. The dough is next divided, weighed, lightly rounded, and then left to rest for a second rising. Following the second rising the dough is flattened to expel carbon dioxide. After flattening the dough is molded into its final form and left to rest in a proofing atmosphere for a final rising. The proofed dough is then baked in a preheated oven. The oven is injected with a jet of steam in order to keep the skin of the dough plastic. The dough is baked to achieve a 78-90 percent pre-cooked product. Before the completed baking time, however, the oven is given a second jet of steam, thus allowing the partially-baked product to retain a substantial amount of moisture, which is at least about 20% more than a fully baked product. The bread is then cooled for a period of about 15 minutes, depending upon its size, and is frozen. The final product is packaged and stored at 0° F.

U.S. Pat. No. 4,303,687, issued Dec. 1, 1981 to Ratjien, discloses a method for the treatment of bakery products to be stored in a deep frozen state wherein water, water vapor and/or steam is injected through the bread crust into the crumb at a weight of approximately 4 grams injected material per 100 grams of completely baked bakery product. The material is injected to prevent an observed phenomenon of separation of the crust from the crumb during deep-frozen storage of the baked good.

None of these references teach or suggest the method of the present invention for preparing a pre-cooked, frozen baked food product which can be reheated in a microwave oven without experiencing the poor textural properties typically associated with microwaved baked food products or the intolerance of oven power variations typically associated with microwaveable products.

It is therefore an object of the present invention to provide a process for preparing a pre-cooked, microwaveable frozen baked food product.

It is also an object of the present invention to provide a product prepared in accordance with the process of the present invention which exhibits improved textural properties when reheated in a microwave oven.

These objects are accomplished by the invention described herein.

SUMMARY OF THE INVENTION

The present invention comprises a process for preparing a pre-cooked, microwaveable frozen baked food product, said process comprising:
 (a) preparing a dough and shaping the dough into a desired preform;
 (b) baking the preform to a fully baked state to produce a baked product having an outer crust; and
 (c) freezing and tempering the baked product by adding moisture to the outer crust in an amount sufficient to raise the moisture content of the baked product to within the range of from about 20% to about 55% by weight.

The present invention further comprises a product produced by the above-described process.

DETAILED DESCRIPTION OF THE INVENTION

The present invention comprises a process for producing a pre-cooked, microwaveable frozen baked food product. In this process a dough from which baked foods can be prepared is initially prepared and then shaped into a desired preform. The preform is then baked to a fully baked state to produce a baked product having an outer crust. Following baking the baked product is frozen and tempered. The tempered and frozen product may then be shipped to the consumer, who reheats the frozen product in a microwave oven.

The dough can be prepared from any formula for preparing baked foods known to those skilled in the art. Of course, the actual formula used will depend upon the type of baked food desired. For example, bread will have a different formula from a biscuit. Examples of the different types of baked foods which can be prepared in accordance with the process of the present invention include, but are not limited to: bread, including but not limited to white bread, wheat bread, French bread, and rye bread; buns, including but not limited to white buns and wheat buns; rolls, including but not limited to dinner rolls, torpedo rolls, and other types of hard rolls; biscuits; and crusts for other foods, for example pizza crust.

The following dough formula is exemplary for a dinner roll:

| Ingredient | Percent |
| --- | --- |
| Wheat Flour | 54.5 |
| Milk | 17.7 |
| Eggs | 11.3 |
| Plastic Shortening | 8.0 |
| Sugar | 6.5 |
| Yeast | 1.2 |
| Salt | 0.8 |
| TOTAL | 100.0% |

The following dough formula is exemplary for bread:

| Ingredient | Percent |
| --- | --- |
| Wheat Flour | 60.3 |
| Milk | 30.0 |
| Water | 3.9 |
| Plastic Shortening | 2.0 |
| Sugar | 2.0 |
| Yeast | 1.1 |
| Salt | 0.7 |
| TOTAL | 100.0% |

The following dough formula is exemplary for French bread:

| Ingredient | Percent |
| --- | --- |
| Wheat Flour | 52.9 |
| Water | 32.0 |
| Plastic Shortening | 11.1 |
| Sugar | 1.9 |
| Yeast | 0.9 |
| Salt | 1.2 |
| TOTAL | 100.0% |

By French bread it is meant a baked product having the formula, density and crust properties associated with bread typically identified by those skilled in the art as French bread, which properties and preparation are discussed in "The World Encyclopedia of Food", L. Patrick Coyle, published by *Facts on File, Inc.*, New York, New York, p. 265 (1982), the disclosure of which is incorporated herein by reference.

The following dough formula is exemplary for a bun:

| Ingredient | Percent |
| --- | --- |
| Wheat Flour | 33.1 |
| Water | 25.0 |
| Milk | 16.5 |
| Plastic Shortening | 9.1 |
| Eggs | 8.6 |
| Sugar | 5.0 |
| Yeast | 1.9 |
| Salt | 0.8 |
| TOTAL | 100.0% |

After the dough is prepared, it is formed into a desired preform. However, prior to preforming it may be necessary to take additional steps to prepare the dough for forming, which will depend upon the type of baked product being prepared and will be apparent to one skilled in the art. For example, for French bread it may be necessary to allow the dough to ferment/rise for a period of time prior to forming, whereas other baked foods such as biscuits and chemically leavened quick bread will not need any such rise time.

The requirements for the forming step will also depend upon the type of baked product being prepared and will be apparent to one skilled in the art. Typically, when preparing bread the dough is divided into individual loaf portions weighing in the range of from about 260 to about 1000, preferably from about 500 to about 550 grams. The individual loafs can be of any desired shape, such as circular, oblong, etc. The height to width to length ratios for oblong loafs and the height to diameter ratios for circular loafs may also be as desired.

As examples, for French bread the dough is typically divided into individual loaf portions weighing in the range of from about 220 to about 1000, preferably from about 460 to about 520 grams. The individual loafs are typically oblong, although other shapes, such as circular, can be made. The height to width to length ratios for oblong loafs and the height to diameter ratios for circular loafs may also be as desired. For buns the dough is divided into portions having a weight typically in the range of from about 30 to about 85 grams, preferably from about 40 to about 70 grams, and is shaped into the desired shape, typically circular. The dough may be shaped by any method known to those skilled in the art. In a preferred embodiment, the dough is shaped by deposition into a mold having the desired shaped, preferably circular. For dinner rolls, the dough is divided into portions having a weight typically in the range of from about 11 grams to about 35 grams, preferably from about 25 to about 30 grams, and is formed into the desired shape. The dough may be shaped by any method known to those skilled in the art, preferably by deposition into a mold having the desired shape. The dough may also be shaped by hand, in which case it typically is deposited onto a baking pan for baking. For biscuits, the dough is preferably sheeted into a sheet of the desired thickness, typically about 2 cm, and is cut into the desired shape and size, typically in a circular shape and having a desired diameter, preferably from about 6 to about 10 cm.

A plurality of the resulting preforms are normally placed in close, barely touching proximity to each other on a sheet for oven baking.

As will be appreciated by those skilled in the art, yeast leavened baked foods have to be proofed after the dough is shaped but prior to baking, whereas chemically leavened baked foods, such as quick breads, do not. When being proofed, the dough is typically placed in a proofing cabinet operated at a temperature in the range of from about 27° C. to about 45° C., preferably from about 33° C. to about 41° C., and at a relative humidity in the range of from about 60% to about 95%, preferably from about 80% to about 90%. The dough is kept in the proofing cabinet for a period of time in the range of from about 10 to about 30, preferably from about 15 to about 20 minutes.

The resulting preforms are fully baked under appropriate conventional baking conditions to produce a baked product having an outer crust. A yeast-leavened baked food is typically considered fully baked when its interior reaches a temperature of at least about 75° C., preferably about 80° C., whereas a chemically leavened baked food is typically considered fully baked when its interior reaches a temperature of at least about 95° C., preferably about 100° C. These interior temperatures are typically achieved by heating the product to a temperature in the range of from about 150° C. to about 240° C., more preferably from about 170° C. to about 225° C., for a corresponding period of time in the range of from about 10 to about 50 minutes, depending on the weight and shape of the baked product.

Of course, the exact conditions under which the preforms are baked will depend upon the type of product, and will be apparent to one skilled in the art. For example, shapes having greater surface-to-volume ratios will cook faster than shapes having lesser surface-to-volume ratios. Examples of baking conditions necessary to fully bake certain select, preferred baked products are as follows: temperatures in the range of from about 150° C. to about 225° C., preferably from about 175° C. to about 210° C., for a period of time in the range of from about 10 to about 30, preferably from about 15 to about 20 minutes for buns; temperatures in the range of from about 150° C. to about 230° C., preferably from about 160° C. to about 220° C., for a period of time in the range of from about 20 to about 75, preferably from about 30 to about 50 minutes for bread; temperatures in the range of from about 160° C. to about 230° C., preferably from about 160° C. to about 190° C., for a period of time in the range of from about 10 to about 20, preferably from about 10 to about 15 minutes for biscuits; temperatures in the range of from about 160° C. to about 220° C., preferably from about 175° C. to about 200° C., for a period of time in the range of from about 10 to about 30, preferably from about 12 to about 20 minutes for dinner rolls; temperatures in the range of from about 170° C. to about 240° C., preferably from about 200° C. to about 230° C., for a period of time in the range of from about 10 to about 45, preferably from about 20 to about 30 minutes for other types of rolls.

Following baking, the baked product is frozen and tempered. The freezing and tempering steps may be carried out in any order, although it is preferred if the product is tempered first and then frozen. The tempering comprises adding moisture to the outer crust in an amount sufficient to raise the moisture content of the baked product to within the range of from about 20% to about 55%, preferably from about 38% to about 48% by weight. Water or other aqueous compositions containing additional edible agents, for example surfactants to aid in the surface dispersion of the water, may be used to temper the baked product. However, the aqueous composition must be capable of imparting a sufficient amount of moisture to the baked product. Water is the preferred tempering agent.

Moisture can be contacted with the outer crust by any method known to those skilled in the art, with the actual method used depending upon the type of baked product being produced. Examples of methods useful herein include, but are not limited to, contacting the crust surface with water or an aqueous composition, such as by spraying the baked product with water or aqueous composition or immersing the baked product in water or aqueous composition, with spraying being preferred; contacting the crust surface with steam; and placing the baked product in a proofing chamber, or subjecting it in some other manner to the temperature and humidity conditions typically found in a proofing chamber.

The resulting baked product is frozen by any methods known to those skilled in the art, preferably by being maintained in an environment having a temperature of about −18° C. or lower for a sufficient period of time to drop the temperature of the product to about −18° C. or lower.

The baked products of the present invention may optionally be filled and/or topped with edible components, examples of which include, but are not limited to, sauces, cheeses, vegetables, meats and mixtures thereof. These fillings and/or toppings will typically be added following tempering and prior to freezing. When so added, the use of such fillings and/or toppings will have no effect on the processing conditions already described herein.

The baked products of the present invention can be individually packaged or group packaged for ultimate use by the consumer. When the product of this invention is to be stored frozen for a substantial period of time, it should be wrapped in a moisture barrier. The wrapping step may occur either before or after the freezing step, preferably after freezing.

When the consumer wishes to use this pre-cooked frozen product, the consumer need only take the product from the freezer, remove it from its container, and place it into a microwave oven and bake it at sufficient power and time to reheat the product to the desired temperature. As with other parameters of the present invention, the necessary time and power requirements will depend upon the type of baked product being reheated, as well as the individual consumers temperature preference for the reheated product. As already stated herein, the frozen baked food products of the present invention are more tolerant of individual power variations in microwave ovens than frozen, baked food products not prepared by the process of the present invention. Even so, there are preferred microwave conditions for reheating the frozen products of the present invention. Examples of typical time and power usage for reheating various baked food products include, but are not necessarily limited to, from about 500 to about 700 watts power for a period in the range of from about 15 to about 40 seconds for buns; from about 500 to about 700 watts power for a period in the range of from about 10 to about 20 seconds for dinner rolls; from about 500 to about 700 watts power for a period in the range of from about 45 to about 300 seconds for bread; from about 500 to about 700 watts power for a period in the range of from about 15 to about 30 seconds for other types of rolls; from about 500 to about 700 watts power for a period in the range of from about 150 to about 240 seconds for turnover-type, baked foods having an edible filling: and from about 500 to about 700 watts power for a period in the range of from about 2o to about 40 seconds for biscuits.

In a preferred embodiment, the process of the present invention for preparing a pre-cooked, microwaveable frozen baked food product comprises:
(a) preparing a dough and shaping the dough into a desired preform;
(b) baking the preform to a fully baked state to produce a baked product having an outer crust;
(c) tempering the baked product by adding moisture to the outer crust in an amount sufficient to raise the moisture content of the baked product to within the range of from about 38% to about 48% by weight, thereby producing a tempered baked food product; and
(d) freezing the resulting tempered baked food product to form a frozen baked food product.

While not intending to be bound by theory, it has unexpectedly been found that the tempered, frozen, pre-cooked baked food products prepared in accordance with the present invention can be reheated in a microwave oven and not exhibit the tough, dry, excessively chewy texture typically associated with products which have been reheated in a microwave oven. This is especially true for products heated with the aid of a heating enhancing agent, device and/or package. These enhancing agents, devices and/or packages are typically used to provide a browning effect on the crust of a food item. A typical example of such an enhancing agent, device and/or package is a metallized paper item which may be in any desired shape or form, for example a flat disc, which is typically used for a pizza, or a wrap-around sleeve, which is typically used for a filled turnover-type item. In use, the baked food product is placed on or within the metallized paper item, depending upon the type of food product being heated. The metallized coating on the paper acts to brown the crust of the food product. However, there is also a negative aspect to this browning effect in that the crust tends to dry out to a greater degree than the rest of the food product. This excessive drying is prevented by the process of the present invention.

It is further unexpected that the products of the present invention display a much greater tolerance to the power output variance of different brands of microwave ovens, so that when reheating such a product one is able to obtain more uniform results, i.e., more constant texture properties, with the use of various ovens than one would experience with a product prepared without the tempering step of the present invention. This is especially evident with the use of a heating enhancing agent, device and/or package.

The present invention further comprises the tempered, frozen, baked products prepared by the process of the present invention. As already discussed herein, such products include any frozen baked product which is capable of being reheated in a microwave oven. Examples of such products include, but are not limited to: bread, including but not limited to French bread, white bread, wheat bread and rye bread; buns, including but not limited to white buns and wheat buns; rolls, including but not limited to dinner rolls, torpedo rolls and other types of rolls; a baked food containing an edible filling, for example a turnover-type baked food; a baked food having an edible topping, for example a pizza; and biscuits. The baked foods containing an edible filling and an edible topping can be filled and topped with any edible ingredients known to those skilled in the art, and can be filled, formed and topped by any method known to those skilled in the art. This invention teaches how to prepare the crust for such filled and topped baked foods in such a manner to provide the unique properties discussed herein.

The present invention is further illustrated, but not limited by, the following examples.

EXAMPLES

Example 1

A dough comprising 60.3% wheat flour, 30.0% milk, 3.9% water, 2.0% plastic shortening, 2.0% sugar, 1.1% yeast and 0.7% salt is prepared. This dough is formed into the shape of a 6-sided loaf of bread. The dough is proofed for 18 minutes in a proofing chamber at a temperature of 38° C. and a relative humidity of 85%. The proofed dough is then baked at a temperature of 195° C. for 30 minutes, thereby raising the internal temperature of the dough to 80° C. The fully baked bread loaf is then cooled to an internal temperature of 25° C. The cooled baked bread weighs 454 grams. The baked bread is then conveyed through an atomizing spray enrober, where water is sprayed onto each of the 6 surfaces of the baked bread through 6 spray nozzles at a total flow rate of 454 grams per minute for a period of 15 seconds. Each of the 6 nozzles is oriented to face one of the 6 separate surfaces of the baked bread loaf. The loaf is then frozen to a temperature of −18° C.

Example 2

A process according to Example 1 except the baked bread loaf is frozen prior to the water application.

Example 3

A process according to Example 1 except the baked bread loaf is allowed to equilibrate for 45 minutes prior to freezing.

Example 4

A process according to Example 1 wherein the 454 gram baked bread loaf is conveyed to an immersion tank containing water, instead of through an atomizing spray enrober. The bread is completely immersed in the immersion tank for a period of 0.5 second. The baked bread loaf is then removed from the immersion tank and the excess water is allowed to drain off the surface of the baked bread loaf. The loaf is then frozen to a temperature of −18° C.

Example 5

A process according to Example 4 except the baked bread loaf is frozen prior to immersion in the immersion tank.

What is claimed is:
1. A process for producing a precooked, microwaveable frozen baked food product which is not tough, dried out, and excessively chewy when heated in a microwave oven, said process comprising:
(a) preparing dough and shaping the dough into a desired preform;
(b) baking the preform to a fully baked state to produce a baked product having an outer crust;
(c) freezing and tempering the baked product by adding moisture to the outer crust in an amount sufficient to raise the moisture content of the baked product to within the range of from about 20% to about 55% by weight; and (d) heating the frozen and tempered baked product in a microwave oven, wherein said baked product is not tough, dried out, and excessively chewy when heated in the microwave oven.

2. A process according to claim 1 wherein the preform is yeast leavened and is baked to an internal temperature of about 75° C.

3. A process according to claim 1 wherein the preform is chemically leavened and is baked to an internal temperature of about 95° C.

4. A process according to claim 3 wherein the product is tempered by spraying water on the outer crust of the baked product.

5. A process according to claim 3 wherein the product is tempered by totally immersing the baked product in a water-filled immersion tank.

6. A process according to claim 4 wherein the baked food is frozen prior to tempering.

7. A process according to claim 4 wherein the baked food is frozen after tempering.

8. A process for producing a precooked, microwaveable frozen baked food product which is not tough, dried out, and excessively chewy when heated in a microwave oven, said process comprising:

(a) preparing dough and shaping the dough into a desired preform;

(b) baking the preform to a fully baked state to produce a baked product having an outer crust;

(c) tempering the baked product by adding moisture to the outer crust in an amount sufficient to raise the moisture content of the baked product to within the range of from about 38% to about 48% by weight, thereby producing a tempered baked food product;

(d) freezing the resulting tempered baked food product to form a frozen baked food product; and (e) heating the frozen baked product in a microwave oven, wherein said baked product is not tough, dried out, and excessively chewy when heated in the microwave oven.

* * * * *